(12) United States Patent
Sundaram et al.

(10) Patent No.: US 9,298,808 B2
(45) Date of Patent: Mar. 29, 2016

(54) ENCRYPTED SEARCH ACCELERATION

(71) Applicant: Symantec, Inc., Mountain View, CA (US)

(72) Inventors: Sharada Sundaram, Mountain View, CA (US); Scott Schneider, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 247 days.

(21) Appl. No.: 13/901,954

(22) Filed: May 24, 2013

(65) Prior Publication Data

US 2014/0351260 A1    Nov. 27, 2014

(51) Int. Cl.
*G06F 7/00* (2006.01)
*G06F 17/30* (2006.01)
*G06F 21/00* (2013.01)

(52) U.S. Cl.
CPC .......... *G06F 17/30613* (2013.01); *G06F 21/00* (2013.01)

(58) Field of Classification Search
None
See application file for complete search history.

(56) References Cited

U.S. PATENT DOCUMENTS

| | | | | |
|---|---|---|---|---|
| 7,519,835 B2* | 4/2009 | Koyfman | .......... | G06F 17/30312 707/999.007 |
| 2006/0248029 A1* | 11/2006 | Liu | ...................... | G06K 9/6256 706/20 |
| 2010/0036862 A1* | 2/2010 | Das | .................. | G06F 17/30917 707/698 |
| 2011/0004607 A1* | 1/2011 | Lokam | .............. | G06F 17/30675 707/759 |
| 2012/0078914 A1* | 3/2012 | Roeder et al. | ................. | 707/741 |
| 2013/0159695 A1* | 6/2013 | Chiueh | .............. | G06F 21/6227 713/150 |

OTHER PUBLICATIONS

Curtmola, Reza. "Searches Through Encrypted Data", filed Apr. 14, 2005, pp. 1-30.*
Curtomola, Reza, "Searches Through Encrypted Data", filed Apr. 14, 2005, pp. 1-30.*
Curtmola, Reza, et al., Searchable Symmetric Encryption: Improved Definitions and Efficient Constructions, retrieved from: 13th ACM Conference on Computer and Communications Security (CCS), ACM Press. (2006) pp. 79-88.
Avram, Abel, Step Toward Better Cloud Security: Searchable Symmetric Encryption, http://www.infoq.com/ news/2010/01/Cloud-Searchable-Encryption >, Jan. 14, 2010, retrieved from Internet Archive Wayback Machine < https://web.archive.org/web/20100628173200/http://www.infoq.com/news/2010/01/Cloud-Searchable-Encryption> on Oct. 8, 2015.

* cited by examiner

*Primary Examiner* — Tuan A Pham
(74) *Attorney, Agent, or Firm* — Patterson & Sheridan

(57) ABSTRACT

Techniques are disclosed for using a false positive-prone data structure to store normalization data for use in an encrypted search context. A file host server in a cloud provider network may provide search functionality for a user's encrypted data by use of a search index. In updating the search index, the server consolidates common identities of the user on different web services (e.g., an e-mail service or a social media service) into a normalized identifier. These normalization values are stored in the false positive-prone data structure (e.g., a colliding hash table, a Bloomier filter, etc.). Consequently, the data structure may return false positives after a search operation. The server may filter out these false positives before returning search results.

15 Claims, 6 Drawing Sheets

| DATA FOR ALICE | ⌐ 205 |

Post 1: {from: alice.1, to: bob.2,carol.3",Lunch today at 12?"}
Post 2: {from: dave.4, to: alice.1,"May I join you for lunch?"}

| NORMALIZATION TABLE FOR ALICE | ⌐ 210 |

| NPID | NAME | EMAIL ID | SOCIAL NETWORK ID |
|---|---|---|---|
| 1  211 | Alice  212 | alice.1  213 | 274  214 |
| 2 | Bob | bob.2 | 125 |
| 3 | Carol | carol.3 | 963 |
| 4 | Dave | dave.4 | 806 |

| SEARCH INDEX FOR NPID 1 | ⌐ 215 |

| KEYWORD | DOCUMENT |
|---|---|
| lunch  216 | post1,post2  217 |
| bob | post1 |
| carol | post1 |
| dave | post2 |

FIG. 2

ENCRYPTED SEARCH ACCELERATION

BACKGROUND

1. Field

Embodiments of the invention generally relate to techniques for searchable encryption. More specifically, techniques are disclosed for updating an encrypted search index using normalized user identifiers.

2. Description of the Related Art

Cloud computing services, such as file sharing services and file storage services, allow users to store data in virtualized pools of storage that are hosted on third party servers. Users of these services may search through their documents and share access with other users in the cloud for collaborative purposes. Although cloud computing offers many benefits, security remains an important concern. For instance, a user may not want a cloud provider to be able to access or modify the user's data stored on a host server. At the same time, a user may want to be able to share data with trusted parties. To maintain privacy, the cloud service encrypts the data so that, generally, only the user may access the data and share access to others who have valid permissions. One consequence of this, however, is that encryption creates difficulty in searching through the data. That is, a cloud provider wants to provide search functionality to a user while still maintaining the encryption. A typical approach is to create a search index while the user is logged in (i.e., the data is decrypted) and to encrypt the search index when the user logs off. Encrypting the search index prevents an attacker from retrieving valuable information about the encrypted data.

However, another challenge arises in situations where there are updates to the data, and therefore the search index needs to be updated, but the user is offline (i.e., the cloud provider cannot access the user's data or the search index). For instance, some cloud providers retrieve data from third party services where a user has an account, such as an e-mail or social media service. If a person, through one of these services, sends a message to the user, the cloud provider must be able to update the user's account to reflect this in the search index. One possible solution is to wait until the user logs in to update the search index with the new data, but this approach requires the user to wait a period of time upon login for the cloud provider to finish updating before the user is able to search through documents. Instead, a server may create a new search index and encrypt the index with a new key and store it, and encrypt the key with the user's public key.

One further problem, however, is that some cloud providers may normalize the identities of people with whom a user communicates across third party web services. A cloud provider may normalize the identities (social network ID's, e-mail addresses, etc.) into an identifier that is unique to the provider and store these normalized identifiers to a table. A cloud provider must additionally protect this normalization table because the table stores information that an attacker may find useful, such as people with whom a user is communicating, their e-mail/social media data, etc. One approach is to simply encrypt the normalization table in the same manner as the cloud provider encrypts the search index. However, this solution hinders the cloud provider's ability to update the normalization table and search index when the user is offline (because only the user has the private key that may access both). Another approach is to encrypt each entry in the normalization table for quick reference. Although this solves the problem of updatability, this approach is vulnerable to dictionary attacks and frequency analyses.

SUMMARY

Embodiments presented herein include a method for managing an encrypted search index. This method may generally include retrieving a first ID and a plurality of terms from a document. Once a first ID has been retrieved, this method includes identifying one or more normalized IDs in a normalization table. The normalization table provides a false-positive prone data structure and the first ID corresponds to the one or more normalized IDs. The method also includes identifying a candidate search index for each normalized ID. One of the search indices is associated with a given user, while any other indices are false positive matches that are actually associated with other users. Upon identifying the indices, each candidate search index based on the plurality of terms is updated.

Other embodiments include computer-readable medium storing instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 illustrates an example data, normalization table, and search index for a user, according to one embodiment.

DETAILED DESCRIPTION

Figure 1:
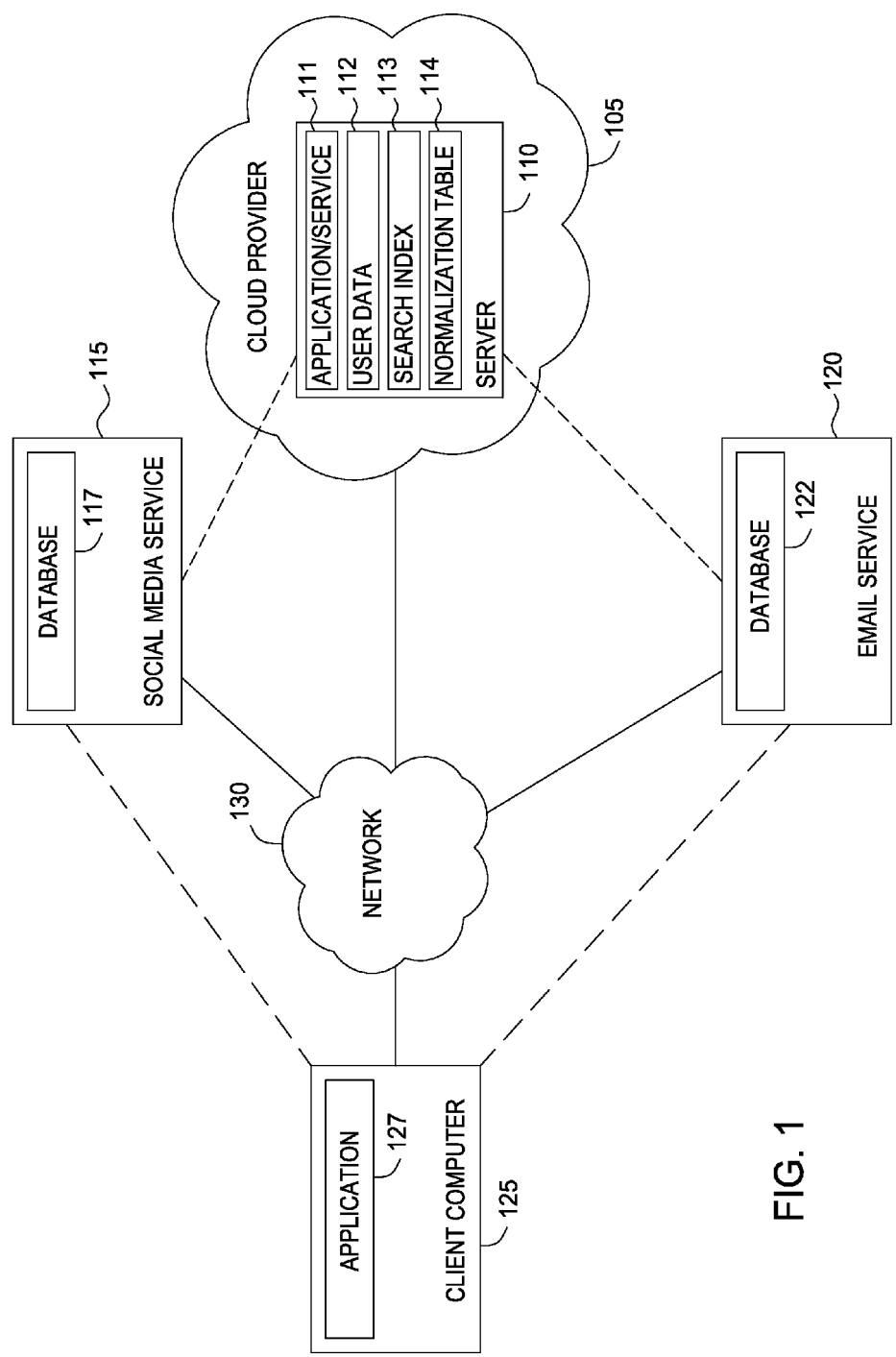
FIG. 1 illustrates an example computing environment, according to one embodiment.

Embodiments presented herein allow a server on a cloud provider to normalize user identities for use in an encrypted search index while a user of the cloud provider is offline. In one embodiment, a false positive-prone probabilistic data structure to is used to compute normalized user identities within an encrypted search context. Such computing methods provide for faster and more efficient lookup when the user logs in and performs a search operation. Moreover, the false positives generated by the data structures prevent an attacker from gaining useful information about the search index.

As noted, a cloud provider may use a normalization table to consolidate common identities from third party services (e.g., from social networks, e-mail services, etc.) into a unified ID that a server may use for more efficient lookup. Because the normalization table contains pertinent information about who a user communicates with, it is important to protect the normalization table (in addition to the user's data and the search index for the data). Further, the normalization table should be protected in a way that does allows the server to update the search index while the user is not online, and that prevents an attacker from using dictionary attacks or frequency analyses to retrieve information from the table.

In one embodiment, a cloud provider may store the normalization table in a probabilistic data structure that is known to generate false positives, such as a Bloomier filter or a collision-prone hash table. For example, a server may map user identities from third party web services to a normalized person ID (NPID), in a colliding hash table. Using such a data structure results in some identities (social network ID's, e-mail addresses, etc.) being mapped to one or more NPID's, creating false positives. Thereafter, when a server retrieves and parses through information for a particular user from a third party web service, such as an e-mail server, the server searches the normalization table for the corresponding NPID. Due to the false positive nature of the data structure, the normalization table may return more than one NPID result. Regardless, the server updates each corresponding NPID's search index with the new information. Consequently, when a user logs onto the cloud service provider and searches by a normalization ID, the false positives from the colliding hash table become false positives in the search results. Although false positives may appear in the search results, the server may easily filter out the false positives before returning the results to the user.

This approach provides higher security and better functionality to any semi-trusted or untrusted cloud service (i.e., the cloud service has limited or no access to a user's data) that requires updating a search index for encrypted data. By using a false positive-prone data structure to store normalization information, a server in the cloud provider network is able to normalize common identities of third party services into identifiers that the host server can use and thus reduce the workload of updating the search index when the user logs in because most of the normalization has already been performed and removing normalization false positives from the index is proportional to the false positive rate. Moreover, this approach provides security for the normalization table against dictionary attacks. That is, any information acquired, if at all, by an attacker may correspond to false positive data, which is generally of little use to the attacker.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud-based application may be configured to facilitate the transfer of user data from a client computer and further provide an interface for a user to share that data with other users.

FIG. 1 illustrates an example computing environment 100, according to one embodiment. The computing environment 100 allows a cloud provider 105 to update a search index storing encrypted data. As shown, the computing environment includes a server computer 110 hosting a computing resource (e.g., application/service 107) and user data 112. The server computer 105 may be a physical computing system (e.g., a system in a data center) or may be a virtual computing instance executing within a computing cloud. A client computer 125 connects to cloud provider 105 through a client application 127 and stores user data 112. Additionally, user data 112 may include information retrieved from third party web services that a user allows cloud provider 105 permission to access, such as a social media service 115 or an email service 120 having databases 117 and 122, respectively. For example, a user Alice, through application 127 on client computer 125, gives permission to cloud provider 105 to access her e-mails and posts from social media service 115 and email service 120. Thereafter, if Alice receives or sends data (e.g., documents, e-mails, or other files) through one of these services, the server may retrieve that information and store it as user data 112 for Alice.

Server computer 110 parses user data 112 to create search index 113. Search index 113 stores user data 112 to provide efficient lookup when a user searches user data 112. Further, a normalization table 114 maps common identities across different third party services to a normalized person identifier (NPID) that is distinct across the cloud network. For example, when a user Alice grants cloud provider 105 permission to access her social media service 115 and email service 120, she provides server computer 110 her identifiers for those services. Whenever application 111 retrieves documents from those services, the search results map to the same NPID on normalization table 114.

In one embodiment, application 111 encrypts user data 112 asymmetrically and clears the private key data from server computer 110. Because server computer 110 does not store the private key, server computer 110 cannot access user data 112 unless the user provides the private key (i.e., the user logs in). Search index 113 stores information about user data 112 that allows a user to search through the data. For example, search index 113 may contain keywords or terms that map to the user's e-mail documents. When a user logs in and searches for a particular term, application 111 retrieves documents from user data 112 that include the term. In one embodiment, the search index 113 is encrypted asymmetrically using a different key held by the server computer 111. Normalization table 114 maps common identities of third party services (such as social media service 115 and e-mail service 120) to a normalized person identifier (NPID). In addition to encrypting user data 112 and search index 113, server computer 110 should also protect normalization table 114 from compromise by an attacker. In one embodiment, server computer 110 does this by storing the normalization table as a probabilistic data structure with a relatively high false positive rate, such as a Bloomier filter or a colliding hash table. As a result, for example, when server 110 retrieves an update from social media service 115 where the user ID corresponds to Alice, normalization table 114 may return Alice's NPID with other false positive values. Even if normalization table 114 returns false positive values, server 110 updates all corresponding search indices 113. Thus, when a user searches for an NPID, application 111 may retrieve false positive results in addition to the actual results, but application 111 may filter and remove the false positives before returning the results to the user.

FIG. 2 illustrates an example data 205, normalization table 210, and search index 215 for a user Alice, according to one embodiment. As shown, set of data 205 includes two e-mail messages in which Alice (represented by e-mail ID "alice.1") is a correspondent. Both messages have a "from:" field, a "to:" field, and a message field. Further, normalization table 210 may include four identifier columns: NPID, Name, Email, and Social Network ID (SNID). Search index 215 is a lookup table organized in a keyword 216 column and a document 217 column. Each NPID has a corresponding search index 215. For example, the search index 215 corresponds to NPID 1 (i.e., user Alice).

Generally, a server on the cloud provider network may asymmetrically encrypt a set of data 205 and search index 215. The server does not store the user's private key, so the server is unable to access the data unless the user is logged in and provides the key. Thus, the encrypted set of data 205 is protected from unauthorized access by third parties. Similarly, the server should protect normalization table 210 from information leaks. If normalization table 210 is left unprotected, an attacker who gains access to the table may be able to ascertain information about with whom a user is communicating. Storing normalization table 210 as a database table (as shown) makes it vulnerable to dictionary attacks. In one embodiment, the server stores the normalization table as a probabilistic data structure that is capable of storing false positive data, such as a Bloomier filter or a colliding hash table.

Figure 3:
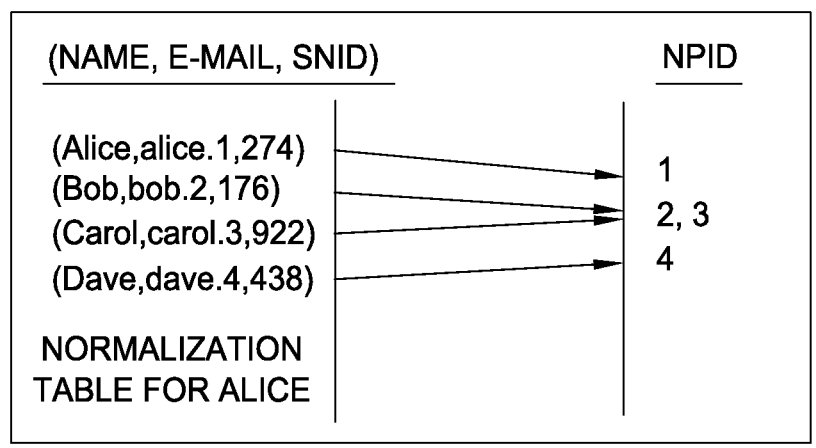
FIG. 3 illustrates an example normalization table implemented as a false positive-prone data structure, according to one embodiment.

FIG. 3 illustrates an example normalization table for a user Alice implemented as a colliding hash table, according to one embodiment. As shown, the example normalization table maps various user identities to NPID values. Note that identity data for Bob and Carol both map to NPID values (2, 3). One consequence of using a colliding hash table to store the normalization table is that the server application updates multiple candidate search indices (one correct, others not). In this case, the server application updates the search indices for Bob's and Carol's corresponding NPID values. Thus, the server may assign a document with an extra identity in the search index. For example, if Alice searches for e-mail conversations with Bob, the search index may return an e-mail conversation that was with Carol. In this case, Carol's conversation is an incorrect result, and the server may filter out this conversation before returning the accurate results to Alice.

The normalization table may also be implemented as other false positive-prone probabilistic data structures, such as a Bloomier filter. Alternatively, data structures that support lookup that are reconfigured as false-positive prone data structures are also applicable. For example, a full binary tree that stores 32-bit lookup values may be pruned to sixteen levels to become a false positive-prone data structure to store the normalization table.

Although the presence of false positives in the normalization table results in some overhead in removing the false positives from search results, this approach allows the server to update search indices while the user is logged out of the cloud service. Further, allowing overhead for false positive data prevents an attacker from gaining any useful information from a dictionary attack or a frequency analysis. In one embodiment, the false positive rate of the data structure may be a preset value to account for more sophisticated attacks or reduce the time of filtering false positives from the search results. For instance, if an attacker suspects that a user communicates with a particular person, the attacker may use the person's e-mail address as a "guess" to confirm the suspicion. If the false positive rate is low (e.g., 10%), and if the server returns an NPID value for that person, the attacker can infer with a high likelihood that the user is indeed communicating with the person. Therefore, in this case, a higher false positive rate may be warranted.

Figure 4:
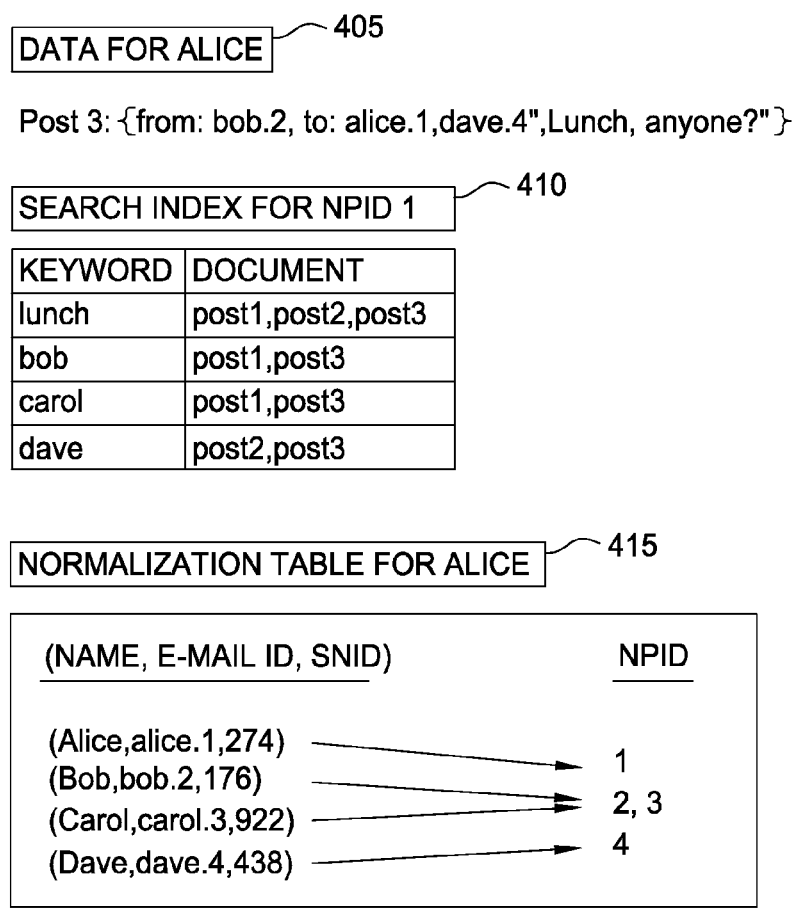
FIG. 4 illustrates an example specific-use case scenario of an update that the server application receives from a third party web service, according to one embodiment.
Figure 5:
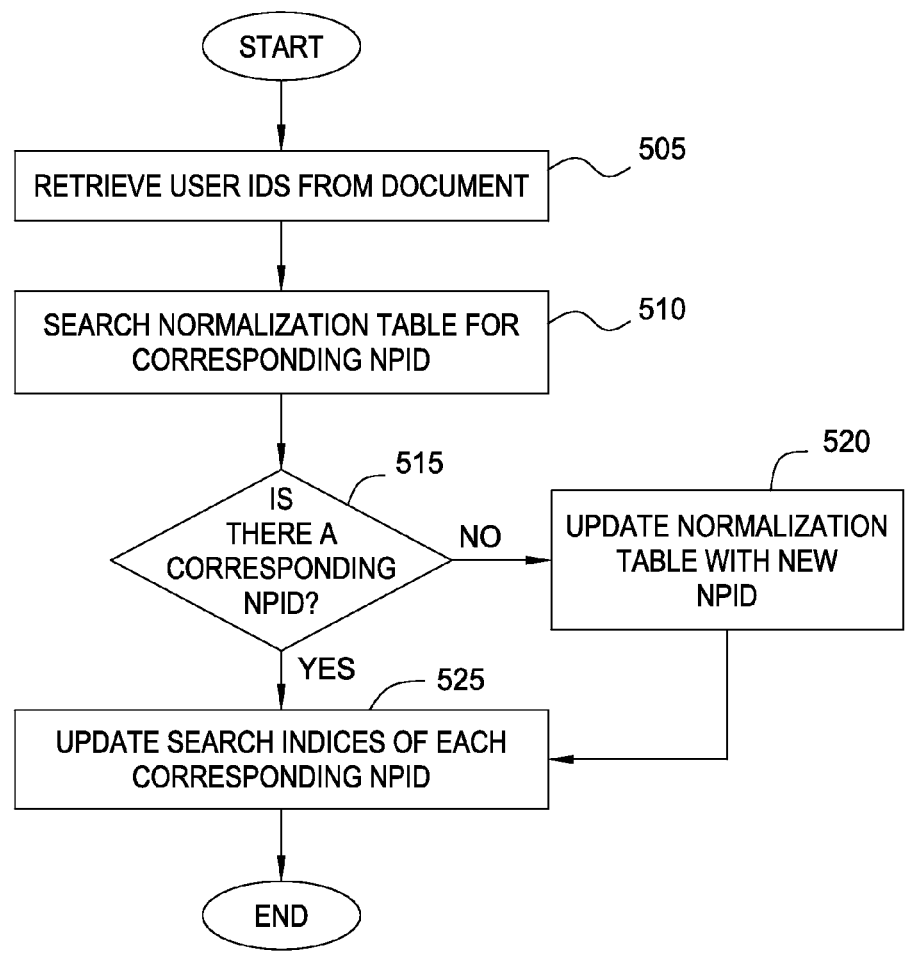
FIG. 5 illustrates an method flow diagram of updating a search index by using normalized data, according to one embodiment.

FIG. 4 illustrates an example specific-use case scenario of an update that the server application receives from a third party web service. FIG. 4 continues the example illustrated in FIG. 2. As shown, FIG. 4 includes data 405 (represented as a Post 3) for user Alice, search index 410 for NPID 1, and a normalization table 415 for user Alice. FIG. 5 illustrates a method flow diagram 500 of updating a search index using normalized data, according to one embodiment. As shown in FIG. 4, Bob sends an e-mail with text, "Lunch, anyone?" to Dave and user Alice while Alice is offline (data for Alice 405). When the server application on the cloud provider retrieves this message from the e-mail server database, the server must update the Alice's NPID search indices. At step 505, the server retrieves the identifiers from the message. These identifiers may include those of the sender and those of the other recipients of the message. In the continuing example, the server retrieves "alice.1," "bob.2," and "dave.1." At step 510, the server searches the normalization table for corresponding NPID values for each identifier from the message.

For each identifier, the server determines whether each NPID has a corresponding NPID in the normalization table (step 515). In one embodiment, if there is no corresponding NPID, then the server may update the normalization table by creating a new NPID and assigning the user identifier to the NPID (step 520). At step 525, the server retrieves the NPID and updates each NPID's corresponding search index with the document information. In the example scenario, the server retrieves NPID's 1 for Alice, 2 and 3 for Bob, and 4 for Dave. Even if NPID 3 actually corresponds to Carol's NPID value (i.e., a false positive), the server nonetheless retrieves it. The server populates each NPID search index with the document information. Thereafter, when a user searches by NPID for Bob, the server may retrieve incorrect information that Carol was a recipient to the document, but the server may filter out false positive search results before returning the actual results to the user.

Alternatively, the server may be configured to remove false positives from the search index so that a search operation does not initially return false positives. In one embodiment, when the user logs in, the server is able to decrypt the original search indices. The server repeats the normalization method above to identify and remove the false positives from the original lookup. Generally, the time to remove the false positives is proportional to the false positive rate.

Figure 6:
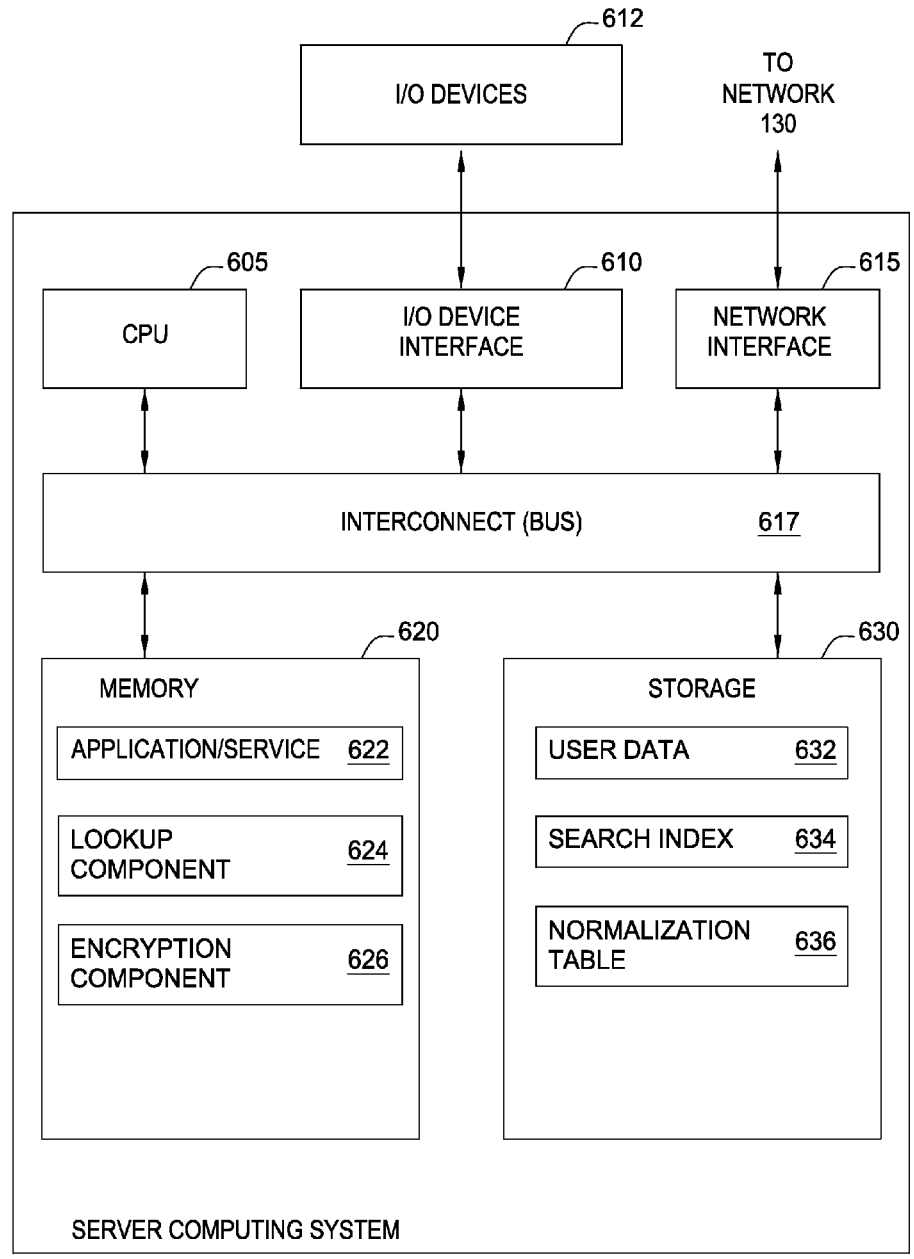
FIG. 6 illustrates an example server computing system configured to compute normalized identifiers within an encrypted search context, according to one embodiment.

FIG. 6 illustrates an example computing system 600 configured to precompute normalized identifiers within an encrypted search context, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, or optical storage, network attached storage (NAS), or a storage area-network (SAN).

Illustratively, the memory 620 includes an application/service 622, a lookup component 624, and an encryption component 626. And the storage 630 includes user data 632, a search index 634, and a normalization table 636. Application/service 622 generally provides one or more software applications and/or computing resources accessed over a network 120 by users. User data 632 may be documents, e-mails, and other files of a user who has an account with the cloud provider. A user may share these files with other users by granting access permissions. Search index 634 is a catalog of the user's data that lookup component 624 uses in searching through user data 632. Encryption component 626 may encrypt user data 632 and search index 634. Normalization table 636 associates common identities from third party services with a normalized identifier. Server computing system 600 stores the normalization table in a false positive-prone data structure, such as a Bloomier filter or a collision-prone hash table.

As described, embodiments presented herein provide techniques for applying false positive-prone data structures to normalize user identities for use in an encrypted search context. A server normalizes user identities by using a false positive-prone data structure to map common user identities to a unified identifier. Advantageously, this approach allows the server to update search indices with new lookup data even if the user is offline and the server has no way to access the encrypted data. Additionally, the embodiments provide a solution that is relatively secure against attacks by a malicious user.

While the foregoing is directed to embodiments of the present invention, other and further embodiments of the invention may be devised without departing from the basic scope thereof, and the scope thereof is determined by the claims that follow.

What is claimed is:

1. A method for managing an encrypted search index, the method comprising:
    retrieving a first ID and a plurality of terms from a document;
    identifying a plurality of normalized IDs in a normalization table, wherein the normalization table is a false positive-prone data structure, and wherein the first ID maps to the plurality of normalized IDs identified in the normalization table;
    identifying a respective search index for each of the plurality of normalized IDs, wherein a first one of the search indices is associated with a given user associated with the first ID, and wherein each of the other search indices are false positive matches each associated with a respective other user;
    updating each of the search indices based on the plurality of terms; and
    receiving a search request, wherein the search request includes a first one of the plurality of normalized IDs;

identifying a first one of the search indices, wherein the first search index corresponds to the first normalized ID;

querying the first search index to retrieve a set of search results from the identified search index, wherein the set of search results includes one or more false positive values;

removing the one or more false positive values from the set of search results; and returning the search results.

2. The method of claim 1, wherein retrieving the first ID and a plurality of terms comprises:

receiving, over a network connection, the document from a database in a third-party web service;

parsing the document to obtain the plurality of terms;

identifying the first ID in the plurality of terms; and returning the first ID and the plurality of terms.

3. The method of claim 1, wherein the false positive-prone data structure is a colliding hash table.

4. The method of claim 1, wherein the false positive-prone data structure is a Bloomier filter.

5. The method of claim 1, wherein the false positive-prone data structure has a preset false positive rate.

6. A non-transitory computer-readable storage medium storing instructions, which, when executed on a processor, performs an operation for managing an encrypted search index, the operation comprising:

retrieving a first ID and a plurality of terms from a document;

identifying a plurality of normalized IDs in a normalization table, wherein the normalization table is a false positive-prone data structure, and wherein the first ID maps to the plurality of normalized IDs identified in the normalization table;

identifying a respective search index for each of the plurality of normalized IDs, wherein a first one of the search indices is associated with a given user associated with the first ID, and wherein each of the other search indices are false positive matches each associated with a respective other user; and updating each candidate search index based on the plurality of terms; and receiving a search request, wherein the search request includes a first one of the plurality of normalized IDs;

identifying a first one of the search indices, wherein the first search index corresponds to the first normalized ID;

querying the first search index to retrieve a set of search results from the identified search index, wherein the set of search results includes one or more false positive values;

removing the one or more false positive values from the set of search results; and returning the search results.

7. The computer-readable storage medium of claim 6, wherein retrieving the first ID and a plurality of terms comprises:

receiving, over a network connection, the document from a database in a third-party web service;

parsing the document to obtain the plurality of terms;

identifying the first ID in the plurality of terms; and returning the first ID and the plurality of terms.

8. The computer-readable storage medium of claim 6, wherein the false positive-prone data structure is a colliding hash table.

9. The computer-readable storage medium of claim 6, wherein the false positive-prone data structure is a Bloomier filter.

10. The computer-readable storage medium of claim 6, wherein the false positive-prone data structure has a preset false positive rate.

11. A system, comprising:

a processor; and a memory hosting an application, which, when executed on the processor, performs an operation for managing an encrypted search index, the operation comprising:

retrieving a first ID and a plurality of terms from a document, identifying a plurality of normalized IDs in a normalization table, wherein the normalization table is a false positive-prone data structure, and wherein the first ID maps to the plurality of normalized IDs identified in the normalization table, identifying a respective search index for each of the plurality of normalized IDs, wherein a first one of the search indices is associated with a given user associated with the first ID, and wherein each of the other search indices are false positive matches each associated with a respective other user, updating each candidate search index based on the plurality of terms, and receiving a search request, wherein the search request includes a first one of the plurality of normalized IDs, identifying a first one of the search indices, wherein the first search index corresponds to the first normalized ID, querying the first search index to retrieve a set of search results from the identified search index, wherein the set of search results includes one or more false positive values, removing the one or more false positive values from the set of search results, and returning the search results.

12. The system of claim 11, wherein retrieving the first ID and a plurality of terms comprises:

receiving, over a network connection, the document from a database in a third-party web service;

parsing the document to obtain the plurality of terms;

identifying the first ID in the plurality of terms; and returning the first ID and the plurality of terms.

13. The system of claim 11, wherein the false positive-prone data structure is a colliding hash table.

14. The system of claim 11, wherein the false positive-prone data structure is a Bloomier filter.

15. The system of claim 11, wherein the false positive-prone data structure has a preset false positive rate.

* * * * *